(12) United States Patent
Moller

(10) Patent No.: US 6,421,759 B1
(45) Date of Patent: Jul. 16, 2002

(54) SINGLE-CYCLE VARIABLE PERIOD BUFFER MANAGER FOR DISK CONTROLLERS

(75) Inventor: Gregory P. Moller, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/596,330

(22) Filed: Jun. 16, 2000

Related U.S. Application Data

(63) Continuation of application No. 08/951,619, filed on Oct. 16, 1997, now Pat. No. 6,157,985.

(51) Int. Cl.$^7$ .............................................. G06F 13/00
(52) U.S. Cl. ...................... 711/112; 711/111; 710/25; 710/58; 710/60; 710/52
(58) Field of Search ................................. 711/112, 113, 711/1–4; 710/1, 25, 32, 52–57, 58–64

(56) References Cited

U.S. PATENT DOCUMENTS

| | | | |
|---|---|---|---|
| 4,454,595 A | 6/1984 | Cage ............................. | 710/52 |
| 5,075,805 A | * 12/1991 | Peddle et al. ................... | 360/61 |
| 5,261,058 A | 11/1993 | Squires et al. .................. | 710/1 |
| 5,291,584 A | 3/1994 | Challa et al. ............. | 364/236.2 |
| 5,465,343 A | 11/1995 | Henson et al. ............... | 711/112 |
| 5,553,208 A | 9/1996 | Murata et al. ............... | 345/425 |
| 5,603,003 A | 2/1997 | Hashimoto ................... | 711/113 |

* cited by examiner

Primary Examiner—Than Nguyen
(74) Attorney, Agent, or Firm—Shawn Dempster; Jennifer Buenzow; Kirk Cesari

(57) ABSTRACT

The present invention relates generally to the field of disc controllers, and more specifically to an efficient buffer manager for a disc controller. A state machine in the buffer manager is provided which is responsive to a clock controlled by a single frequency base clock signal and a speed selection signal which indicates the speed of the buffer memory and which is designed to provide a base clock signal for the state machine having a fixed base period and an extended second portion of the cycle period which is extended to reflect the time of the RAMs cycle, plus the necessary time to allow for circuit delays and the like. Thus, different speed RAMs can be used in association with the buffer manager designed in this manner, while always controlling access for reading and writing to the RAM during a single complete cycle of the buffer manager. This allows for direct gating of all control signals to the buffer RAM, simplifying the design of the buffer memory controller and its associated logic. The buffer manager synchronizes all requests from various sources, and utilizes a single clock cycle of varying periods to accommodate all speeds of RAMs with just one base synthesizer frequency in order to reduce the cost and maximize simplicity oft he buffer manager design.

1 Claim, 8 Drawing Sheets

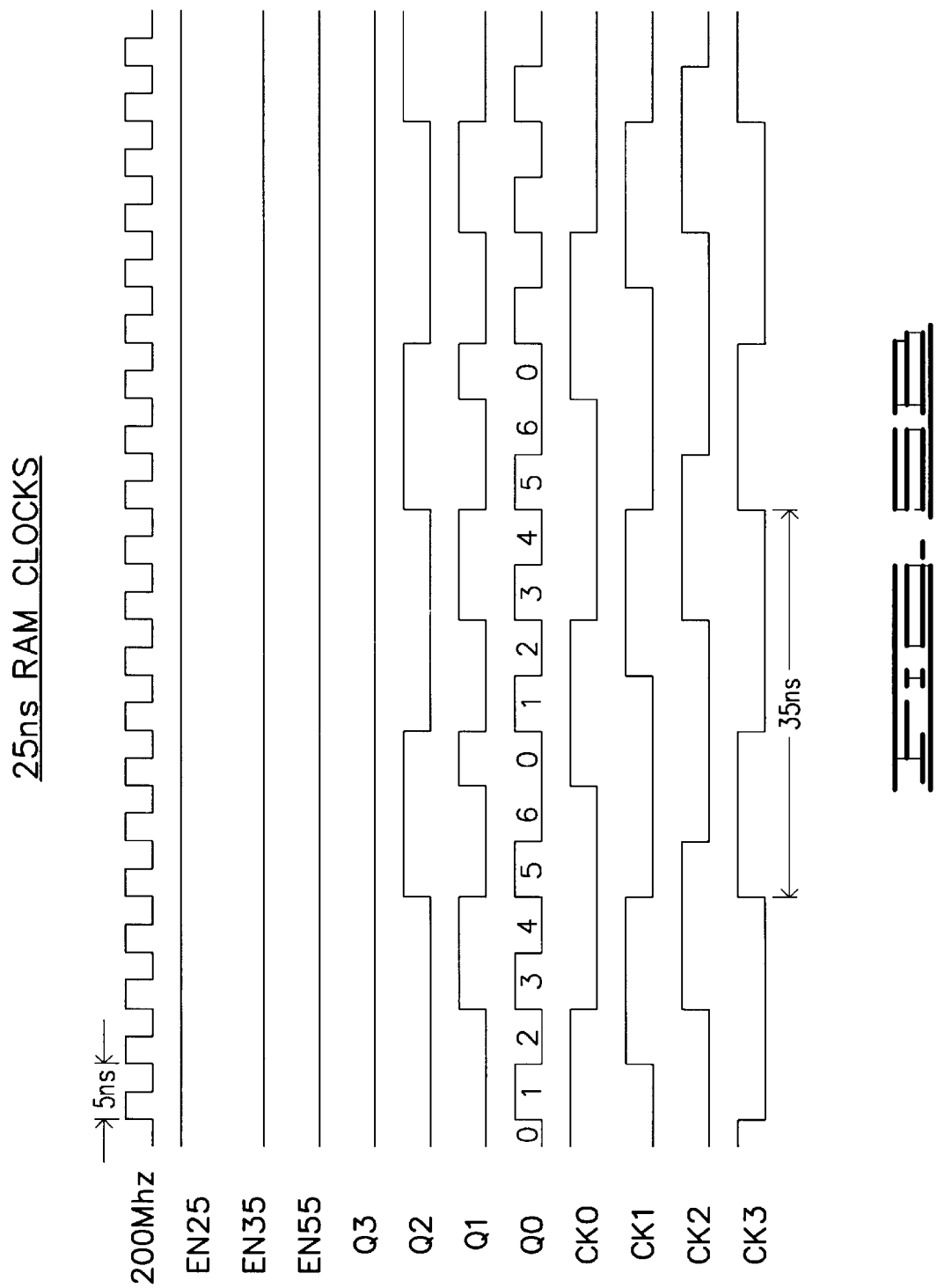

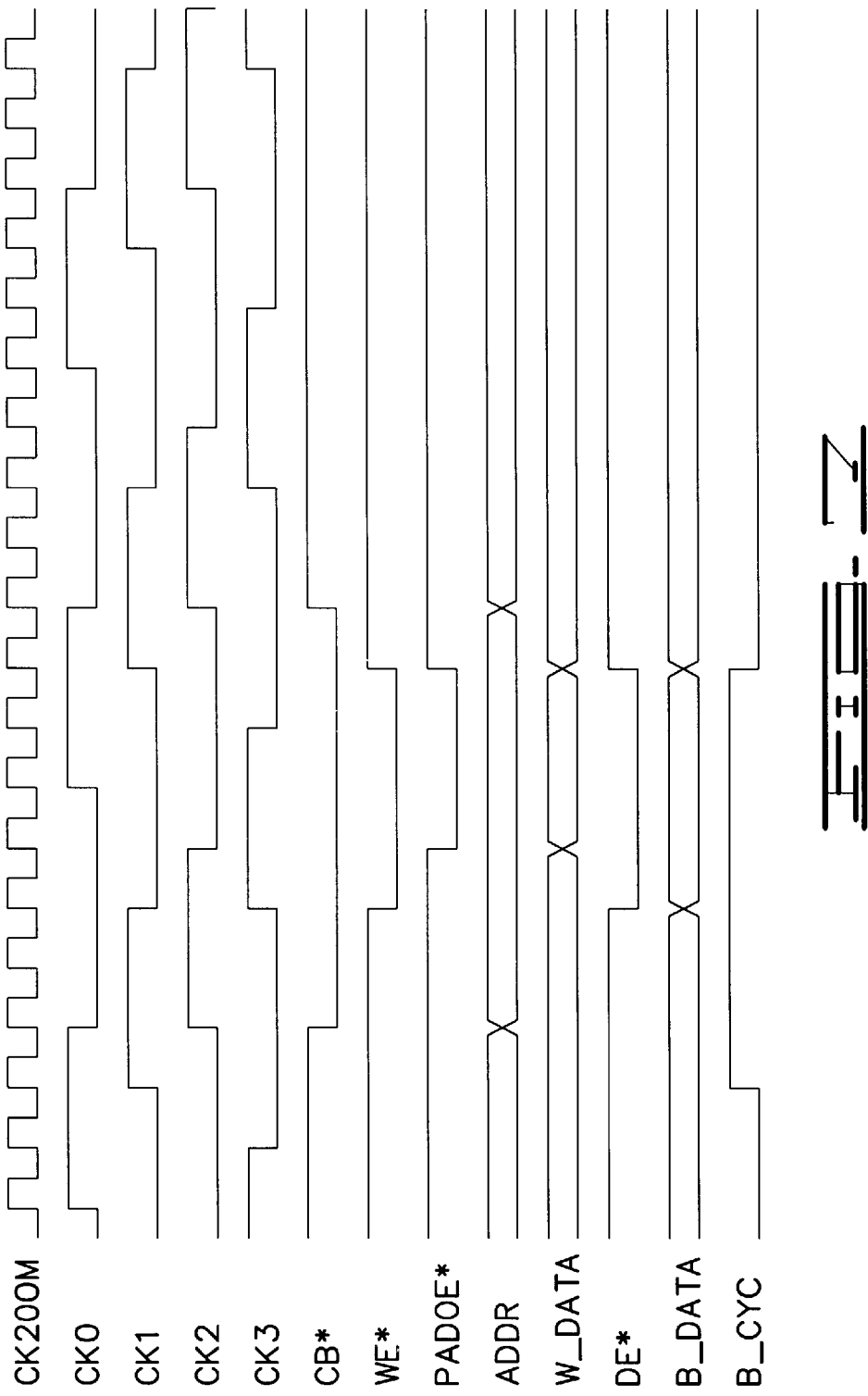

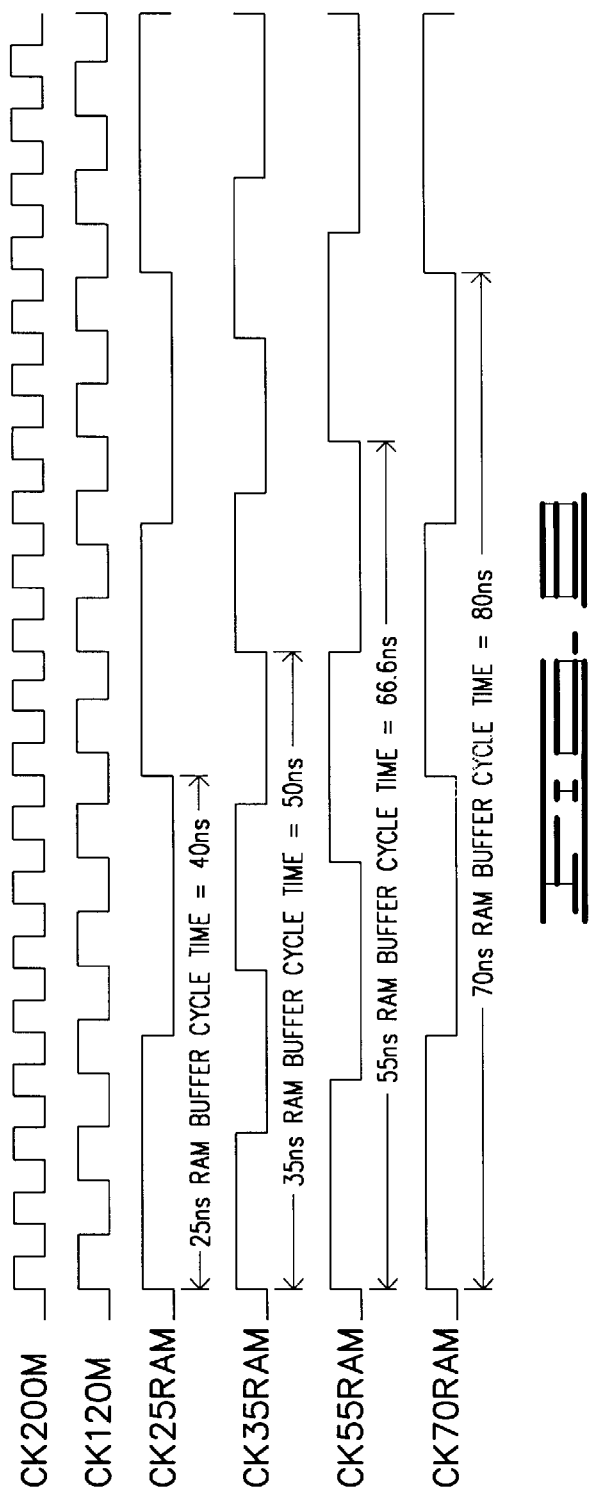

SINGLE-CYCLE VARIABLE PERIOD BUFFER MANAGER FOR DISK CONTROLLERS

This continuation application claims priority to pending U.S. application Ser. No. 08/951,619 filed Oct. 16, 1997, now U.S. Pat. No. 6,157,985.

FIELD OF THE INVENTION

The present invention relates generally to the field of disc controllers, and more specifically to an efficient buffer manager for a disc controller.

BACKGROUND OF THE INVENTION

A continuous challenge to the disc drive industry is to continually reduce cost per megabyte while increasing performance and capacity. As consumer demand for low cost/high capacity/high performance non-volatile storage grows, the pressure to create new and innovative solutions is tremendous. One area of great focus is electronics cost and performance. One way to trade off costs versus performance is to design a buffer manager that can support a range of different speed RAMs so that a given set of electronics can be as inexpensive as possible for the required performance. Thus it is important to maximize the efficiency of the RAM by creating buffer cycles that are as close as possible to the RAM speed. Because of pad and board trace delays that vary with the environment some overhead must be designed into the buffer cycle. Thus, a serious need exists for a clocking scheme for the buffer manager that allows various speed RAMs to be easily supported with a constant overhead.

A typical generation of electronics in a state of the art disc drive today supports multiple speeds of RAMs by supplying different clock frequencies with different RAM speeds, and using one or two clocks per buffer cycle. This results in a complex design with varying overheads for the various speed RAMs. FIG. 9 illustrates the problem created by such a complex design.

The field of which the present invention is used can best be understood by reviewing FIGS. 1, 2 and 3. FIG. 1 shows a disc drive of the type in which this invention would be used connected to a host computer 12 via a host interface 14. The hard disc drive 10 contains drive electronics 16, the hard disc 18 on which data is stored, and the mechanical components 20 which control the rotation of the hard disc and the positioning of the read/write arm.

FIG. 2 shows the drive electronics which are generally present in current state of the art disc drives. The drive electronics 16 include, among other things, a microcontroller 20; a hard disc controller 22; a buffer RAM 26; and servo electronics 24. The microcontroller 20 controls all aspects of the drive operation at a high level. The microcontroller 20 communicates through the interface 14 with the host computer 12, and generally sequences operation of the drive and electronics to read from and write to the hard disc 18. The servo electronics 24 generate control signals for the mechanical components of the disc drive to ensure the transducer is properly aligned with a desired store location in the disc drive. The buffer RAM 26 is the buffer memory in the system. It is used for temporary storage of data which is being transferred between the host computer 12 and the hard disc drive 10. Finally, the hard disc controller 22 is a low level controller for the disc drive. Under commands from the microcontroller 20, it generates control signal for the various components of the disc drive to control the transfer of data; to generate and check error correction codes; to store status information and other data used by the microcontroller 20; and to format and synchronize communications signals from various parts of the disc drive and host computer.

FIG. 3 shows details of the hard disc controller 22 and includes, among other things, a host interface 14; a microcontroller interface 32; a disc interface 34; an ECC checker/generator 36; a clock generator 38; and a buffer controller 39.

The host interface 14 is for receiving commands from the host computer 12; the commands herein are formatted in order to be read by the microcontroller 20. The microcontroller interface 32 is for communicating with the microcontroller. Through this interface, the microcontroller reads information registers housed in the hard disc controller and directs the operation of the hard disc 18. The disc interface 34 is for communicating with the read/write heads on the disc. Data comes through this interface and is formatted for use by other components. The clock generator 38 generates several clock signals used by the hard disc drive components. The ECC generator/checker 36 generates error control and correction information for data which is being transferred to/from the disc drive. It also checks ECC information coming off the drive for accuracy. Finally, the buffer controller controls access to the RAM buffer 26 and is the focus of the present invention. When data is read from the drive, it is first formatted and then stored in the buffer. The RAM buffer acts as a synchronization area for data, and allows data coming off the disc in one format at one speed to be transmitted to the microcontroller 20, the ECC 36, or the host computer 12 at another speed or format. Similar functions are accomplished in reverse for data being written. Many components may need to read/write from/to the RAM buffer. The ECC generator/checker will read/write data from/to the RAM buffer to correct errors in the data read from the disc. The disc interface will need access to the RAM buffer to store data from the disc or to read data that is to go to the disc. The microcontroller can also access the RAM buffer directly to monitor/modify data. The host computer accesses the buffer to store data in route to the disc or to receive data from the disc. It is the job of the buffer controller to synchronize these commands and provide access in a timely and efficient manner to the buffer memory.

SUMMARY OF THE INVENTION

It is an object of the present invention to provide a buffer manager that easily synchronizes all requests from various sources, and utilizes a single clock cycle of varying periods to accommodate all speeds of RAMs. Buffer managers need to manage access to different speeds of RAM, because RAMs of different speeds may be available on the market at different costs at different times. It is important to easily and reliably be able to use whatever RAM is available in a disc drive controller without having to provide a complex buffer manager. It is a further objective of this invention to provide direct gating of control signals of the RAM, so that complexity of the buffer manager is simplified.

In current electronic buffer manager designs, the buffer manager requires multiple base synthesizer frequencies to generate the base clock. It is an objective of the present invention to require just one base synthesizer frequency in order to reduce the cost and maximize simplicity of the buffer manager design.

In current electronic designs for the buffer manager, the manager requires state machines that use variable numbers of clocks to generate buffer cycles. Therefore, it is an object of this invention to use one clock cycle per buffer cycle, thus simplifying the design and reducing associated costs.

A further objective of the invention better utilizes available memory bandwidth, thereby allowing cheaper memories to be used for a given level of performance.

These and other objectives of the invention are achieved by providing a state machine in the buffer manager which is responsive to a clock controlled by a single frequency base clock signal and a speed selection signal which indicates the speed of the buffer memory and which is designed to provide a base clock signal for the state machine having a fixed base period and an extended second portion of the cycle period which is extended to reflect the time of the RAMs cycle, plus the necessary time to allow for circuit delays and the like. Thus, different speed RAMs can be used in association with the buffer manager designed in this manner, while always controlling access for reading and writing to the RAM during a single complete cycle of the buffer manager. This allows for direct gating of all control signals to the buffer RAM, simplifying the design of the buffer memory controller and its associated logic.

Other features and advantages of the present invention would become apparent to a person of skill in the art who studies the present invention disclosure. Therefore, a more detailed description of a preferred embodiment of the invention is given with respect to the following drawings.

BRIEF DESCRIPTION OF THE DRAWINGS

FIG. 5B is an illustrative timing diagram of the signals generated in and utilized in the clock generator of FIG. 5A;

FIG. 6 is a timing diagram showing the output signals from the buffer manager of FIG. 4 for various speeds of dynamic random access memories;

FIG. 8 is a timing diagram representing the control signals generated in prior art buffer manager systems;

FIG. 9 is a diagram illustrating the efficiencies achieved by the present invention as compared to the prior art of FIG. 8.

DETAILED DESCRIPTION OF A PREFERRED EMBODIMENT

Figure 1:
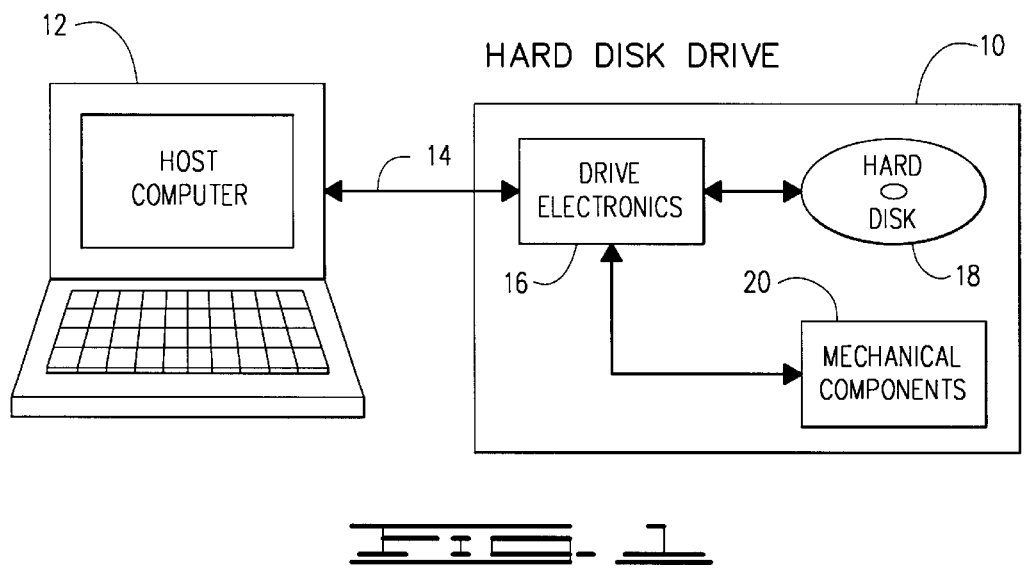
FIG. 1 is a block diagram of the host computer and associated hard disc drive forming the system in which the present invention is useful.

FIG. 1 shows a disc drive of the type in which this invention would be used connected to a host computer 12 via a host interface 14. The hard disc drive 10 contains drive electronics 16, the hard disc 18 on which data is stored, and the mechanical components 20 which control the rotation of the hard disc and the positioning of the read/write arm.

Figure 2:
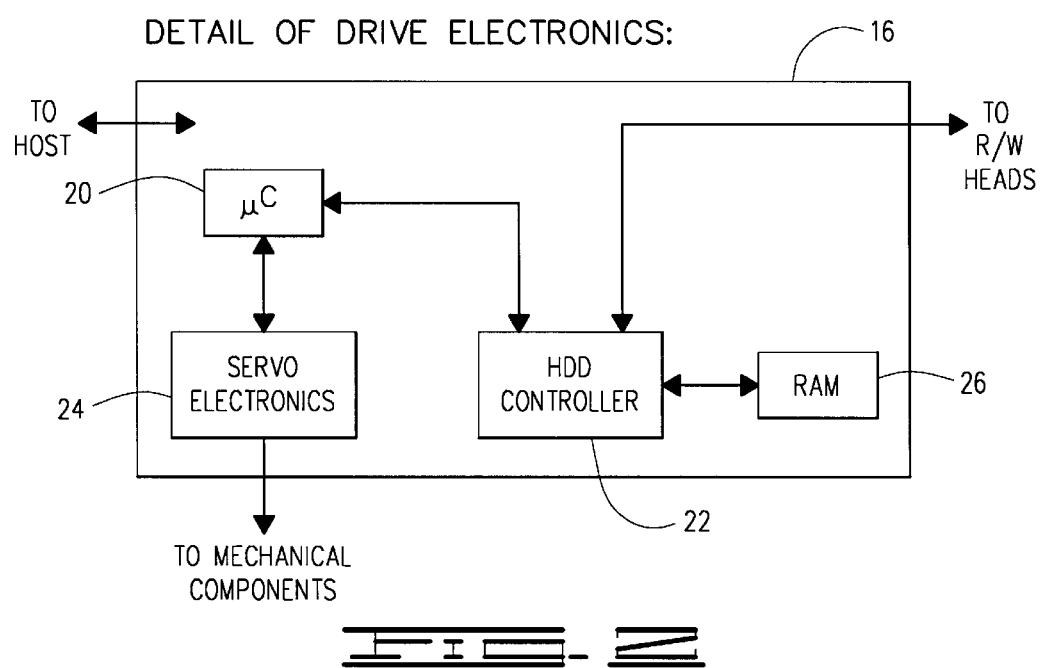
FIG. 2 is a more detailed block diagram of the drive electronics utilized in the hard disc drive of FIG. 1.

FIG. 2 shows the drive electronics which are generally present in current state of the art disc drives. The drive electronics 16 include, among other things, a microcontroller 20; a hard disc controller 22; a buffer RAM 26; and servo electronics 24. The microcontroller 20 controls all aspects of the drive operation at a high level. The microcontroller 20 communicates through the interface 14 with the host computer 12, and generally sequences operation of the drive and electronics to read from and write to the hard disc 18. The servo electronics 24 generate control signals for the mechanical components of the disc drive to ensure the transducer is properly aligned with a desired store location in the disc drive. The buffer RAM 26 is the buffer memory in the system. It is used for temporary storage of data which is being transferred between the host computer 12 and the hard disc drive 10. Finally, the hard disc controller 22 is a low level controller for the disc drive. Under commands from the microcontroller 20, it generates control signal for the various components of the disc drive to control the transfer of data; to generate and check error correction codes; to store status information and other data used by the microcontroller 20; and to format and synchronize communications signals from various parts of the disc drive and host computer.

Figure 3:
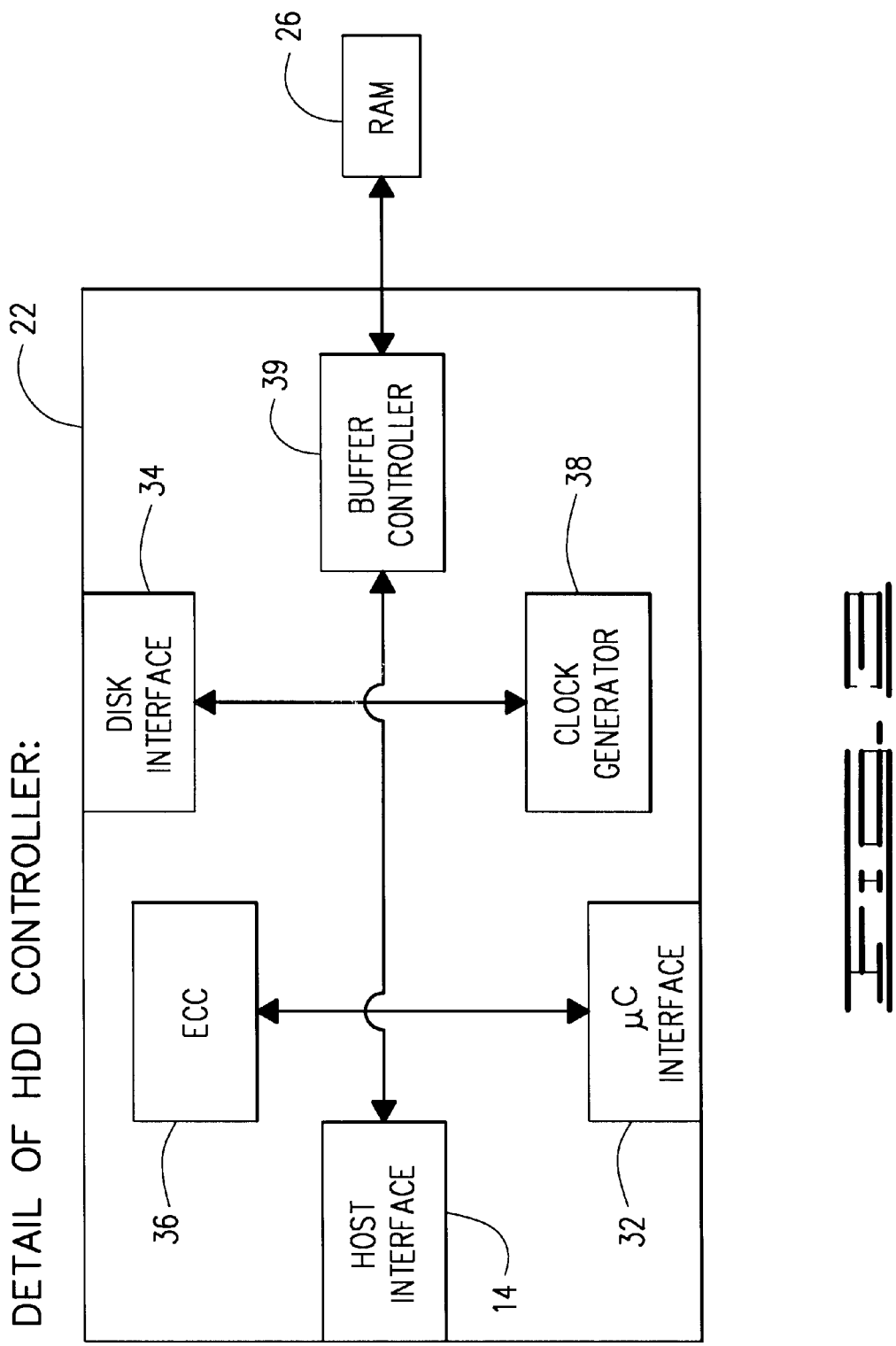
FIG. 3 is a more detailed block diagram of the hard disc drive controller used in the drive electronics of FIG. 2.

FIG. 3 shows details of the hard disc controller 22 and includes, among other things, a host interface 14; a microcontroller interface 32; a disc interface 34; an ECC checker/generator 36; a clock generator 38; and a buffer controller 39.

The host interface 14 is for receiving commands from the host computer 12; the commands herein are formatted in order to be read by the microcontroller 20. The microcontroller interface 32 is for communicating with the microcontroller. Through this interface, the microcontroller reads information registers housed in the hard disc controller and directs the operation of the hard disc 18. The disc interface 34 is for communicating with the read/write heads on the disc. Data comes through this interface and is formatted for use by other components. The clock generator 38 generates several clock signals used by the hard disc drive components. The ECC generator/checker 36 generates error control and correction information for data which is being transferred to/from the disc drive. It also checks ECC information coming off the drive for accuracy. Finally, the buffer controller controls access to the RAM buffer 26 and is the focus of the present invention. When data is read from the drive, it is first formatted and then stored in the buffer. The RAM buffer acts as a synchronization area for data, and allows data coming off the disc in one format at one speed to be transmitted to the microcontroller 20, the ECC 36, or the host computer 12 at another speed or format. Similar functions are accomplished in reverse for data being written. Many components may need to read/write from/to the RAM buffer. The ECC generator/checker will read/write data from/to the RAM buffer to correct errors in the data read from the disc. The disc interface will need access to the RAM buffer to store data from the disc or to read data that is to go to the disc. The microcontroller can also access the RAM buffer directly to monitor/modify data. The host computer accesses the buffer to store data in route to the disc or to receive data from the disc. It is the job of the buffer controller to synchronize these commands and provide access in a timely and efficient manner to the buffer memory.

Figure 4:
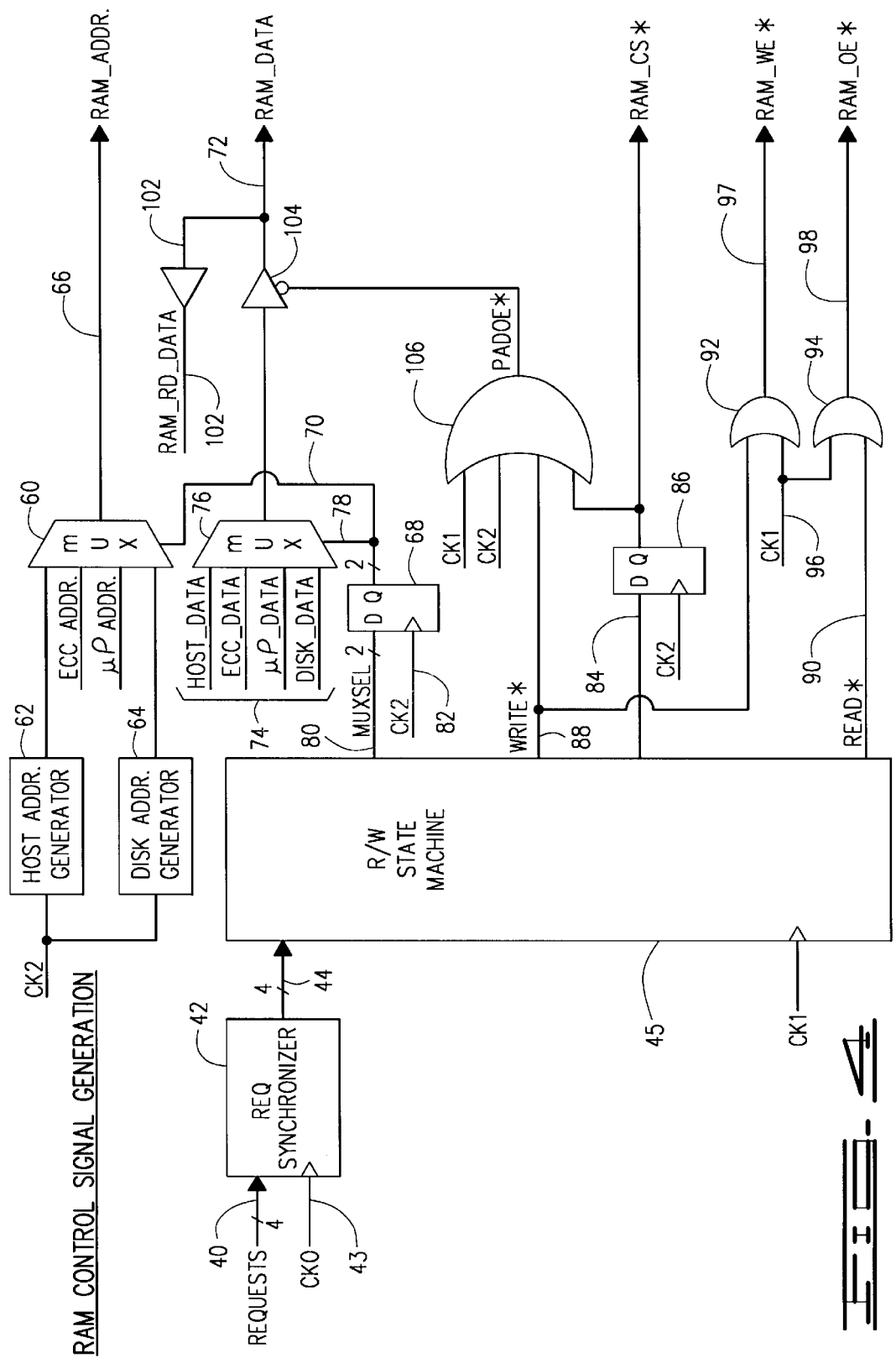
FIG. 4 is a block diagram of hardware and associated logic utilized to generate the control signals in the buffer manager of the present invention.

Turning next to FIG. 4, this shows details of a representative portion of the buffer controller which uses a single variable period clock signal to generate and directly connect all the necessary control signals to access a buffer memory for reading and writing. Familiarity with the primary components of a disc drive controller is presumed for purposes of this discussion and description. The control signals to be named are all standard unless otherwise identified.

When a component such as the host 12, ECC 36, microprocessor 32 or disc 34 (FIG. 3) seeks access to the RAM buffer, a request is provided on the request line 40 to the request synchronizer 42. The sequence for executing the request is initiated by the receipt of the CK0 signal on the line 43, resulting in the synchronizer sending a prioritized, synchronized request over the output line 44 to the read/write state machine 45.

Figure 5A:
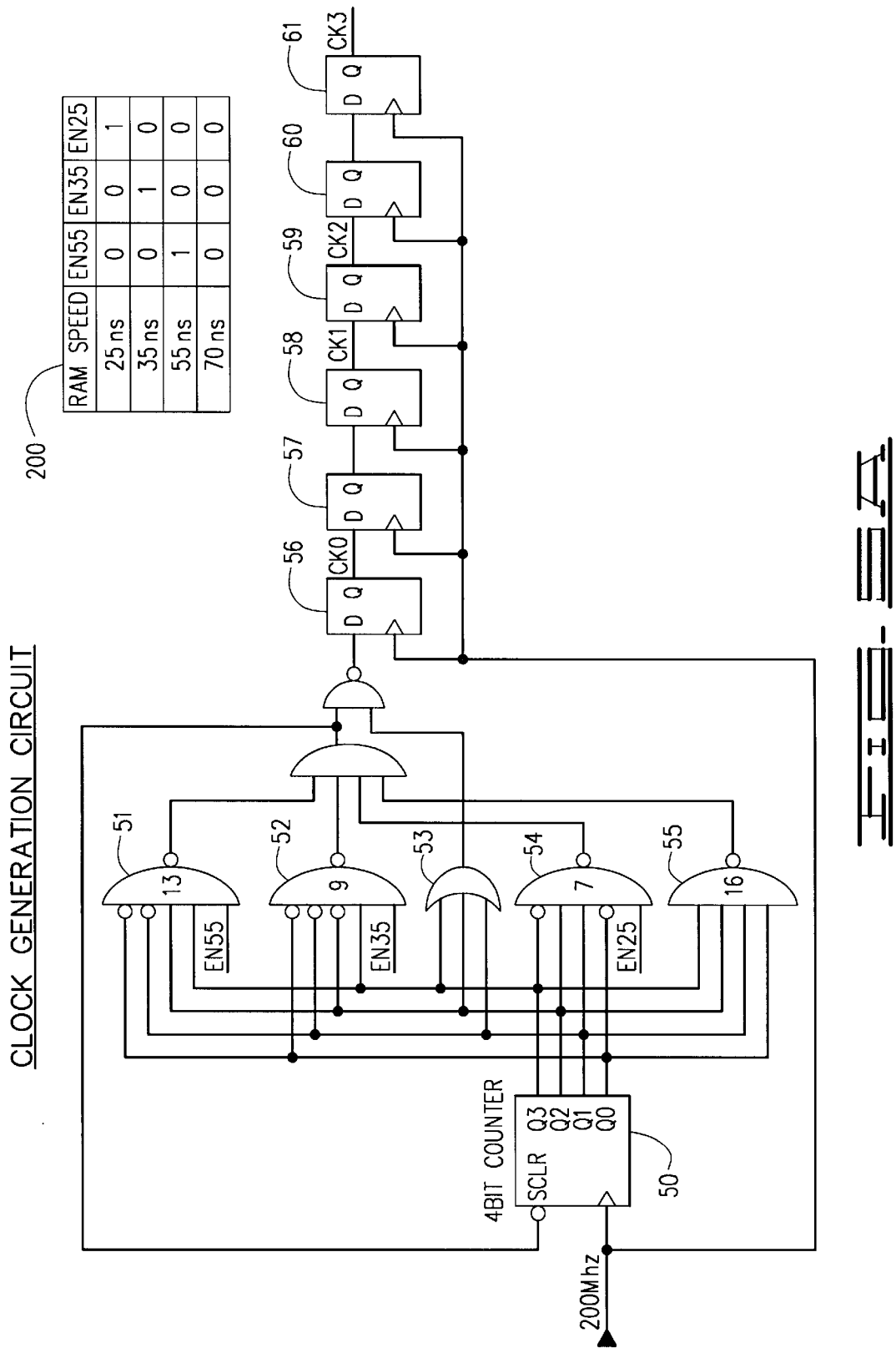
FIG. 5A is a block diagram of the clock generation circuit for the clock generator used in association with the control electronics of FIG. 4.

It can be seen in FIG. 4, the operation of synchronizer 42 is controlled by clock CK0, and the operation of the state machine 45 by clock signal CK1. It is therefore appropriate at this point to refer to FIGS. 5A and 5B. FIG. 5A shows the clock generation circuit which uses a four bit counter 50 and a plurality of gates 51–55 to generate the clock signal CK0, CK1, CK2 and CK3 which control the generation of the various signals utilized to access the RAM buffer in FIG. 4. It can be seen in FIG. 5A that the timing of these signals will be set according to which one of the lines EN25, EN35, or EN55 is high. Only one of these lines will be high at any given time, as shown in the table 200 of FIG. 5A and at the top of FIG. 5B. If all three lines are low, then a RAM speed of 70 ns is indicated as shown by the table 200 in FIG. 5A.

Referring again to FIG. 5B, this tiring chart also shows as an example that in this particular case the RAM buffer is comprised of 25 ns RAM's. Therefore, the line EN25 is high, and the lines EN35, EN55 are low. As a result, each of the signals CK0, CK1, CK2 and CK3 has a period of 35 ns as represented at the bottom of the figure. This time represents the time necessary for a complete buffer cycle. The remaining signals which appear in FIG. 5B labeled Q0, Q1, Q2 and Q3 are the outputs of the four bit counter 50 and are supplied to each of the gates 51–55 to provide the necessary signals to the D flip-flops 56–61 whose outputs are the timing control signals CK0–CK3.

By using this clock generating scheme shown in FIGS. 5A and 5B, a single clock generator can be used to control the generation of all the necessary signals (see FIG. 4) to access, for reading or writing, the buffer RAM, with the signals now being dependent on the speed of the RAM chips selected for use in the buffer memory. The input signals EN25, EN35 and EN55 are each set in a register which can be programmed at any time to reflect the physical chips which are incorporated in the disc drive being assembled.

Figure 7:
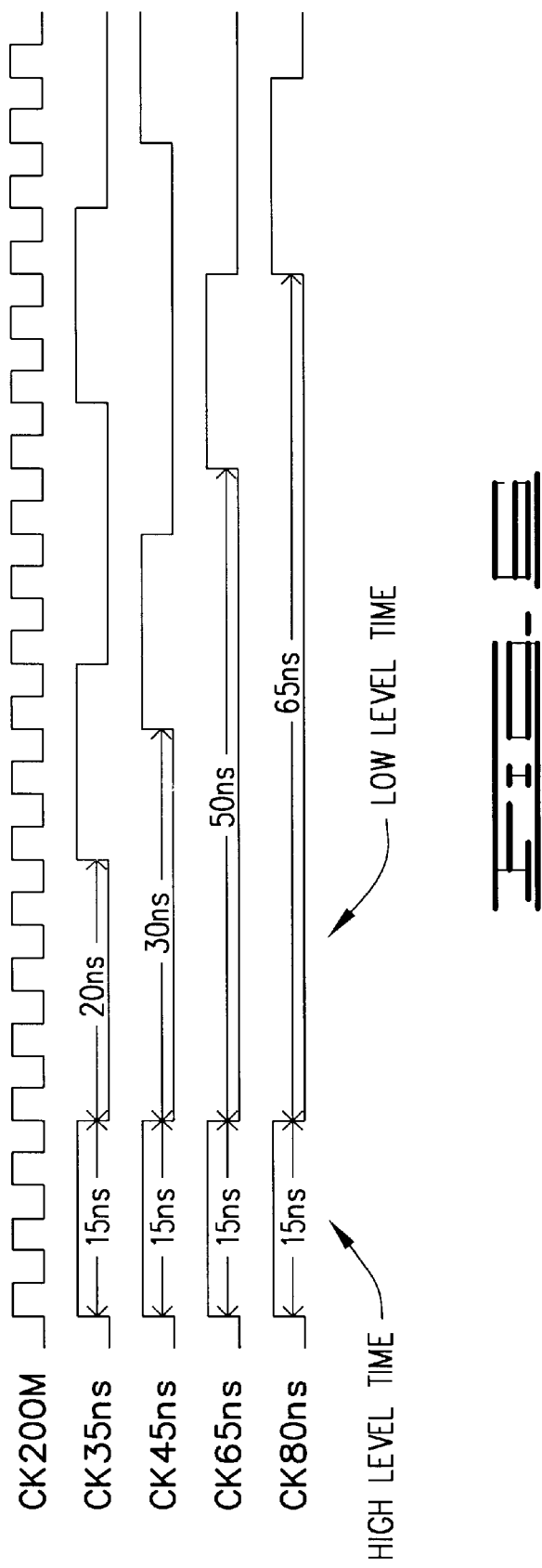
FIG. 7 is a timing diagram for the specific signals generated by the buffer manager control electronics of FIG. 4.

Returning to FIG. 4, the read/write state machine 45 generates the control signals which are shown on the output lines at the right hand side of FIG. 4 and which also appear together with a few other signals in FIG. 7 for the RAM based on the type of request which appears on the request line 40. The time required to set up the RAM and transfer one byte to or from the RAM is called the buffer cycle. The read/write state machine 45 responding to the access request and to the clock signal CK1 generates the same control signal regardless of the speed of the RAM, although these control signals may be of different duration.

Each cycle of the CK1 input to the read/write state machine 45 causes the state machine 45 to generate the signals for a complete buffer cycle of the buffer RAM 26. All other timing of signals within the buffer cycle is handled by directly gating the output signals of the read/write state machine 45 using the other clock signal CK0, CK1, CK2. When a request is received on request line 40, the associated address from the same source is also provided to the MUX 60. This address would appear slightly later in the buffer cycle as shown in FIG. 7, and is either provided directly from the ECC or the microprocessor, or from a host address generator 62 or a disk address generator 64 as initiated by the clock signal CK2. When an address is to be provided on the RAM address line 66, the MUX output is initiated by the D-flip-flop 68, which supplies a signal over the line 70 to the MUX 60. Alternatively, data may be provided on the RAM data fine 72 as supplied from any of the four sources on the lines 74. In this case, the MUX 76 which receives the associated address is also initiated by the D-flip-flop 68 over the fine 78. The timing of the appearance of the address labeled ADDR in FIG. 7, and the data labeled W DATA in FIG. 7, can be clearly seen in that Figure relative to the beginning of the signals CK2 and the buffer cycle labeled BCYC in the same Figure. It can also be seen that the D-flip-flop 68 provides the MUX control signals on the line 70, 78 in response to an MUXSEL signal from the state machine on line 80, and a control signal CK2 on line 82 so that the address or data are supplied to the buffer memory in a proper time sequence. The state machine 45 also supplies a chip select signal on line 84 to a D-flip-flop 86 whose output is timed by clock signal CK2 so that the proper chip among a plurality of chips in the buffer memory is selected. The timing of this signal labeled CS also appears at the sixth line of FIG. 7.

The state machine 45 also supplies a WRITE signal on line 88 and a READ signal on line 90 to gates 92, 94 which also receive control signal CK1 on line 96 to generate either a write enable signal WE or an output enable signal OE on lines 97, 98 respectively. The signals WE and OE controlling access to the RAM, are generated by directly gating the CK1 signal with control signals from the read/write state machine 45. "Directly gated" means that the CK1 signal is fed directly into a gate to synchronize the assertion of the signal to the RAM. "Directly gated" is in opposition to "non-directly gated", a type of signal characteristic of the prior art, where a dock signal is used to generate an intermediate control signal which then is used to synchronize the timing of a signal to the buffer RAM. A non-directly gated signal may have to be used where the signal to the RAM must be held for a complete buffer cycle or longer. The control signal is thus not generated in the same way (relative to the dock signal CK) all of the time. In the prior art, frequently two clock signals per buffer cycle had to be provided, and sometimes one, so the control signal had to be synced differently depending on the particular instance.

When data is read from the buffer RAM 26, the data is passed through the buffer to the RAM DATA signal bus 72 and then through the output line 102 onto the RD DATA line 103. When data must be written to the buffer RAM, the output oft he data MUX 76 is connected to the RAM DATA bus by a low asserted transmission gate 104 enabled by the write signal from the state machine directly gated through gate 106 by signals CK1, CK2.

Returning to FIG. 5A, this signal shows the generation of the clock signal CK0–CK3. As discussed above, the input signals EN55, EN35 and EN25 are used as speed selection signals to select the speed of the clock cycle according to the chart 200 which accompanies this circuit. As shown, on the top line of FIG. 5B, a base clock of 200 mhz is presented to a four-bit counter 50 which counts from 0 to 15. The counter starts at 0 for each sequence. The three input OR gate 53 senses when the counter output is 2 or higher and causes the clock signals to go low. When the counter reaches a number corresponding to one of the AND gates 51, 52, 54 or 55, the clock signals are caused to go high again and the counter is reset. This structure causes the output clock cycles to have a high level time which is fixed at three cycles of the base dock (15 ns for a 200 mhz base clock) and a variable length low level time corresponding to the time between counts 2 and X of the counter, where X is selected by the speed signals EN25, 35 or 55. The possibility of a 70 ns RAM is presented by not enabling any of the other three gate inputs as shown in the Table 200. The circuit shown in this diagram thus produces clock cycles for 25, 35, 55 and 70 ns RAMS. Each output clock cycle is set up to be 10 ns longer than the corresponding RAM speed. The D-flip-flops in 56–61 in the chain at the output end create the four docks, with each dock separated from the others by a multiple of 5 ns.

FIG. 5B shows a timing diagram of the clock generator for a 25 ns RAM which would require cycles with a 35 ns period. Thus each of the bottom four lines CK0–CK3 have signals with a period of 35 ns. It can be seen that clock CK0 is high for the first two counts of the counter. Beginning with count 3, clock CK0 goes low. This is the beginning of the low level time. The low level time ends when the count reaches 6, and the counter is reset to 0. When the counter reaches 0, the high level time begins again and the cycle is repeated. Clock CK1 is delayed from count 0 by two counts; clock CK2 is delayed by another count; and clock CK3 is delayed by two more counts. It should be noted that clock CK3 does not appear in FIG. 4; this is an extra count which may be used to acknowledge back to the microprocessor or for other purposes.

FIG. 6 shows the clocks generated by the present invention for each RAM speed. Each clock has a fixed overhead of 10 ns more than the sp of the RAM.

Each clock generated has a high level time of 15 ns, and a low level time long enough to include the access time plus the overhead time, so that the output signals from the state machine may be generated in a timely sequential fashion.

FIG. 7 shows the relative timing of several of the control signals for one buffer cycle. At the top line is the base clock labeled CK200M. Next follows the dock signal generated by the circuit of FIG. 5A, CK0–CK3. The next line is the RAMCS signal; as shown here, it is synchronized to the CK2 signal by the D flip-flop 86 in FIG. 4. Next is the RAMWE signal, which is directly gated by the CK1 signal so it is low in synchronization with the low level of clock 1. Next is the ADDR signal as it exits from the MUX 60; the MUX select signal is synched on clock CK2 by the D flip flop 68 so that the address changes in sync with CK2 in this FIG. 7.

Next is the WDATABUS as it exits from the transmission gate during a write; it is directly gated by the combination of CK1 and CK2 so it is valid for the combined low level time of the two clocks.

Next is the RAMOE signal, output enable; it is directly gated by the CK1 signal so it is low in synchronization with the low level clock 1. Next is the R DATA signal coming from the RAM buffer, ungated but in response to the OE signal. Next is the BUFFER CYCLE signal used to show the length of the buffer cycle and corresponding to the period of clock 1. All the necessary RAM control signals as shown herein are generated by gating the clock signals or by a D-flip-flop. No state machine is necessary to synchronize the control signal timing within a buffer cycle, as is the case with the prior art.

For comparison, FIG. 8 shows the clock signals used by the prior art buffer controller. Each RAM speed has a different overhead (the overhead equal to buffer cycle time minus RAM speed). Thus, typically the efficiency of the present invention is greater than the prior art (where efficiency equal 100 times the RAM speed/the buffer cycle time) i.e., the buffer cycle is more closely matched to the RAM speed. The table of FIG. 9 aptly illustrates the efficiency which is achieved by this invention. In prior art, the buffer cycle time may be either one or two cycles of the clock, depending on the RAM speed. In FIG. 8, the buffer cycle time is two clock cycles for all RAM speed other than the 25 ns RAM. For the 25 ns RAM, the buffer cycle time corresponds to one cycle of the clock. Also note that in the prior art, two base clocks were used to generate the clocks for the different RAM speeds.

In the prior art, the clock signals could not be directly gated to form the RAM control signals because depending on the speed of the RAM, sometimes two cycles occurred in a buffer cycle, and sometimes one. Thus, two separate synchronizing systems had to be used, one for single cycle speeds, and one for dual cycle speeds As an example, imagine trying to directly gate the RAM_ OE signal as shown in FIG. 4 if CK1 goes through two cycles during the same buffer cycle, It wouldn't work because RAM_OE would go low two separate times. Also in prior art there were essentially two read/write state machines, one for the single cycle case and one to handle the dual cycle case (or one complicated one that could handle both cases).

In sum, the prior art was too complicated. The prior art used clocks which were based on two separate base clocks, two clock cycles per buffer cycle for some ram speeds and one clock cycle per buffer cycle for other ram speeds. This caused complications in the buffer manager, the read/write state machine had to accommodate single and dual cycle buffer periods; and control signals could not generally be directly gated because they had to be held for two clock cycles in dual-cycle buffer period and because they had to be generated in a completely different way for the two cases.

The present invention solves this by redesigning the buffer controller to utilize a single cycle buffer period no matter what the RAM speed. This allows simple read/write state machine design (fewer gates, less die area . . . ) because the state machine will generate the same signals in the same way for every RAM speed. Thus, the state machine is simplified.

Also, because all buffer periods are single cycle, and because control signals are generated in the same way from the same clocks for every RAM speed, the control signals can be directly gated from the clock signals.

Side benefits include increased efficiency because when they redesigned it, they chose closer fitting buffer cycle times, and there is only one base clock for all ram speeds.

Other features and advantages of the present invention may become apparent to a person of skill in the art who studies this disclosure. Other alternatives may also become apparent. Therefore, the scope of the present invention is to be limited only by the following claims.

What is claimed is:

1. A buffer control system for a hard disk controller connected to buffer memory for storing information in the buffer memory and reading information from the buffer memory, the buffer control system comprising:

means for receiving a clock signal; and means responsive to the clock signal for generating control signals for storing and reading information from the buffer memory, wherein the generating means operates by directly gating the clock signal to produce the control signals and wherein a buffer cycle time equals the period of the clock signal regardless of the speed of the buffer memory.

* * * * *